March 6, 1951        G. W. WOLCOTT        2,544,209
METHOD OF FORMING VALVE CLOSURES
Filed April 22, 1944
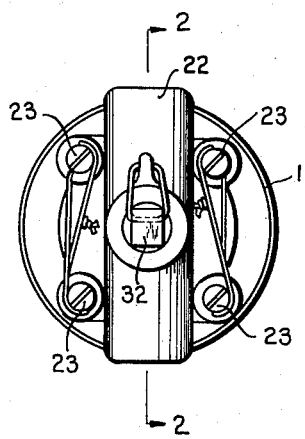
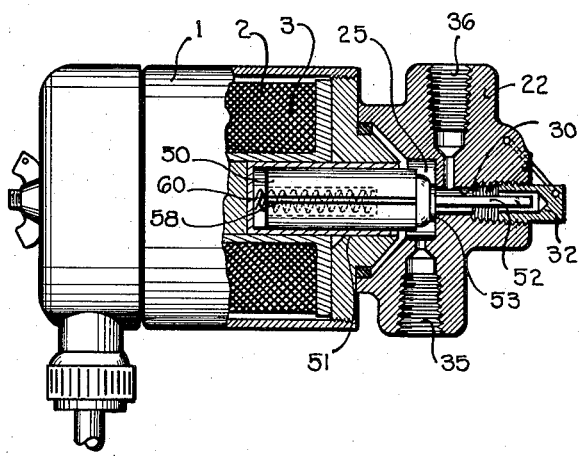
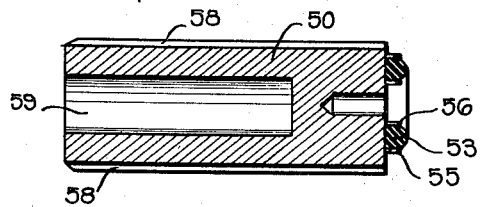
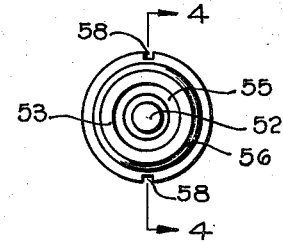
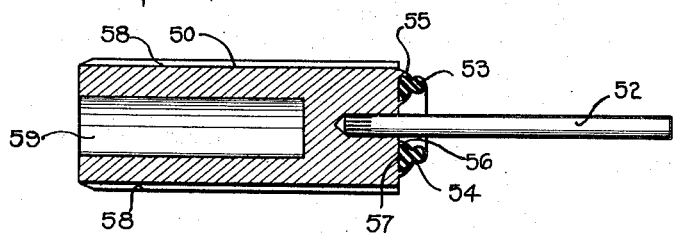
INVENTOR.
Glenn W Wolcott
BY C B Stevens
ATTORNEY.

Patented Mar. 6, 1951

2,544,209

UNITED STATES PATENT OFFICE 2,544,209

METHOD OF FORMING VALVE CLOSURES

Glenn W. Wolcott, Dayton, Ohio, assignor to United Aircraft Products, Inc., Dayton, Ohio, a corporation of Ohio Application April 22, 1944, Serial No. 532,272

3 Claims. (Cl. 29—157.1)

1

This invention relates to solenoid plungers, and more particularly to a plunger carrying a valve for use in a dilution valve structure, such as exemplified in my co-pending application for United States Letters Patent Serial No. 459,573, filed September 24, 1942, now abandoned, of which this application is a continuation in part.

The primary object of the invention is to provide a solenoid plunger which carries a non-metallic valve whereby to eliminate a metal to metal seal between the valve and its seat, and thus reduce leakage to a minimum, and also break down or fracture of the valve and/or its seat by and upon impact of the valve against the seat.

Another object of the invention is to provide a valve structure or a closure having an opening in a plane surface, and a method of making the same, wherein the contact portion of the valve is securely and rigidly held in position, or connected to the end of the plunger so as to insure positive or concentric seating of the valve against the plane surface, thereby to eliminate chattering with resultant leakage, and also damage to the valve or the valve seat.

Still another object of the invention is to provide a closure for an opening in a plane surface such as to assure a straight line action of the closure, and also assure uniform engagement of the valve surface with the plane surface.

The invention has still further and other objects which will be later set forth and of themselves manifested in the course of the following description, and also in the accompanying drawings wherein:

Fig. 1 is a front elevation of an oil dilution solenoid valve;

Fig. 2 is a view on the line 2—2 of Fig. 1, partly in elevation and partly in section;

Fig. 3 is a front elevation of the plunger including the valve closure;

Fig. 4 is a sectional view taken on line 4—4 of Fig. 3 but showing the assembly of the plunger and the closure device prior to securing the closure device to the plunger; and Fig. 5 is a section view taken on the line 4—4 of Fig. 3 and showing the assembled plunger.

In the illustrated form of the invention and in accordance with the disclosure of my co-pending application hereinbefore referred to, a casing is provided in which an electro-magnet 2 is disposed, such electro-magnet having the usual solenoid coil 3. A head 22 is secured to the casing by bolts 23, and has a chamber 25 at its inner end which has communication with the inner end of a longitudinal passage 30. The outer

2 end of the chamber 25 extends through the outer side of the head and is closed and sealed by a plug 32. Such head 25 is formed with an inlet 35 and an outlet 36 for the diluent, both communicating with the passage 30.

A solenoid plunger 50, preferably of elongated cylindrical and substantially solid form operates in a liner 51 secured to and within the solenoid 3, and has a rod 52 rigidly secured thereto at one end. The rod 52 is disposed in the passage 30, and has its outer end lying adjacent to the outer end of the passage whereby upon removal of the plug 32 the plunger 50 may be manually moved for unseating of the valve.

The present invention relates to the securement of a ring 53 of resilient deformable material, which constitutes a valve closure and seats against the flat outer side wall of the chamber 25, of the plunger 50. The ring 53 has a flat base adapted to rest in an annular groove 57 in the plunger 50 which groove 57 is defined by inner and outer rings 55 and 56 carried by the outer end of the plunger and resulting from reaming or cutting the end of the plunger.

In accordance with this invention the resilient deformable ring 53 is of substantially the same height as the rings 55 and 56 except for an arcuate projecting portion, and after placement of the ring 53 in the groove 57 formed by the rings 55 and 56 such rings are spun or otherwise deformed toward each other into engagement with the ring 53 so that the circumferential edge portions of the rings 55 and 56 pinch the side of the ring 53 and define a peripheral groove 54 therein thus firmly and positively holding the ring 53 in position on the end of the plunger. The deforming or spinning of the rings 55 and 56, as shown, is to such an extent that a portion of the ring 53 will be extruded to provide an annular resilient sealing ring having an accentuated rounded surface which may make substantially a point or line contact with the flat outer face 25 around the opening 30. The term "accentuated rounded surface" and similar expressions as used in the specification and claims herein is intended to describe the shape assumed by the exposed portion of the sealing ring after the seal has been gripped by the rings 55 and 56. It will be seen from a comparison of Figs. 4 and 5, that pinching the ring seal 53 in effect shortens the radius of the exposed portion whereby the curved outline thereof becomes more sharp and distinct.

Preferably the upper sides of the valve ring 53 are convexly curved so as to be conformably engaged by the rings 55 and 56, thereby to obtain a more positive gripping or clamping engagement of the rings 55 and 56 with such valve ring 53, and for the purpose of assisting in holding the valve firmly seated, the plunger has its periphery provided with longitudinal grooves 58 which extend through its ends and provide passage for the flow of the diluent therealong, and further has its rearwardmost end formed with a chamber 59 and in which is located a spring 60. Therefore, the diluent under pressure entering the inlet 35 flows through the passages 58 to be effective on the rearwardmost end of the plunger by exerting pressure against and augmenting the action of spring 60 to hold the resilient ring 53 against the outer face of the chamber 25.

In operation, the electro-magnet is energized to retract the plunger and thereby move the resilient ring 53 away from the outer chamber 35 so that the diluent flows through the outlet 36 and thence to the oil system. Upon release of the plunger the pressure of the spring and of the diluent exerted against the end of the plunger, as above described, causes the valve to seat and thereby shut off the flow of the diluent through the outlet 36.

It is to be understood that the herein disclosed and embodiment of the invention is by way of example and various changes in shape, size and arrangement or a combination of the parts may be resorted to without departing from the spirit of the invention.

I claim:

1. The method of forming a closure for an opening in a plane surface which consists in forming a body with concentric annular deformable outwardly extending ring members, inserting an annular resilient deformable ring member of a height substantially equal to the height of said spaced outwardly extending ring members except for an arcuate projecting portion between such ring members and then deforming the free ends of such latter ring members toward each other into gripping engagement with the resilient deformable ring member therebetween and to such an extent as to provide an extruded portion of accentuated arcuate contour serving as an annular resilient sealing ring for engagement with that part of the plane surface surrounding the opening therein.

2. The method of forming a closure for an opening in a plane surface which consists in forming a metal body to provide concentric annular deformable inner and outer rings, and a closed bottom, inserting a resilient deformable annular ring member having a flat inner face and an arcuate upper portion, and having a height which except for said arcuate portion is substantially equal to the distance from the closed bottom to the free ends of the said spaced annular deformable inner and outer rings, and then spinning the free ends of said inner and outer rings into gripping engagement with the resilient deformable annular ring and to such extent as to extrude the arcuate upper portion thereof to provide an annular resilient sealing ring of accentuated roundness for engagement with areas of the plane surface surrounding the opening therein.

3. The method of forming a closure for an opening in a plane surface which consists in forming a metal body with concentric annular deformable outwardly extending ring members, inserting an annular resilient deformable ring member of a height substantially equal to the height of said spaced outwardly extending ring members except for an arcuate projecting portion between such ring members, and then deforming the free ends of such latter ring members toward each other into gripping engagement with the resilient deformable ring member therebetween, and to such extent to extrude the arcuate projecting portion of the ring to provide an annular resilient sealing ring of accentuated roundess for engagement with that part of the plane surface surrounding the opening therein.

GLENN W. WOLCOTT.

REFERENCES CITED

The following references are of record in the file of this patent:

UNITED STATES PATENTS

| Number | Name | Date |
|---|---|---|
| 256,109 | Locke | Apr. 4, 1882 |
| 702,383 | Tyson | June 10, 1902 |
| 849,989 | Ferguson | Apr. 9, 1907 |
| 1,090,775 | Birch | Mar. 17, 1914 |
| 1,161,257 | Scoville | Nov. 23, 1915 |
| 1,185,022 | Swank | May 30, 1916 |
| 1,247,235 | Diss | Nov. 20, 1917 |
| 1,950,120 | McKee | Mar. 6, 1934 |
| 2,197,606 | Birch | Apr. 16, 1940 |
| 2,271,391 | Drake | Jan. 27, 1942 |
| 2,279,243 | Parsons | Apr. 7, 1942 |

FOREIGN PATENTS

| Number | Country | Date |
|---|---|---|
| 11,477 | Great Britain | Sept. 9, 1886 |